United States Patent [19]

Weiss

[11] Patent Number: 4,816,515

[45] Date of Patent: Mar. 28, 1989

[54] IMPACT MODIFIED POLYPHENYLENE ETHER INTERPOLYMER RESINS

[75] Inventor: Kurt A. Weiss, Pittsfield, Mass.

[73] Assignee: General Electric Company, Pittsfield, Mass.

[21] Appl. No.: 37,763

[22] Filed: Apr. 13, 1987

[51] Int. Cl.⁴ ............................................. C08L 71/04
[52] U.S. Cl. ..................................... 525/68; 525/285; 525/301; 525/396; 525/397; 525/905
[58] Field of Search ................................ 525/68, 905

[56] References Cited

U.S. PATENT DOCUMENTS

| | | | |
|---|---|---|---|
| 4,172,859 | 10/1979 | Epstein | 525/111 |
| 4,454,284 | 6/1984 | Ueno et al. | 525/905 |
| 4,460,743 | 7/1984 | Abe et al. | 525/68 |

*Primary Examiner*—Jacob Ziegler
*Attorney, Agent, or Firm*—Hedman, Gibson, Costigan & Hoare

[57] ABSTRACT

Compositions with enhanced impact strength, solvent and thermal aging resistance are prepared by interpolymerizing polyphenylene ether resins functionalized with acids or anhydrides, e.g., fumaric acid, and rubbers, e.g., EPDM rubbers, grafted with glycidyl acrylates or methacrylates.

31 Claims, No Drawings

IMPACT MODIFIED POLYPHENYLENE ETHER INTERPOLYMER RESINS

This invention relates to impact modified polyphenylene ether compositions and, more particularly, to glycidyl methacrylate or glycidyl acrylate grafted rubbery impact modifier for polyphenylene ether resins that have been functionalized with an effective amount of a carboxylic acid or carboxylic acid anhydride.

BACKGROUND OF THE INVENTION

Polyphenylene ether or modified phenylene ether resins are high performance engineering thermoplastics that have found extensive uses in a wide variety of manufacturing areas including automotive applications, e.g., dashboards, electrical connectors, filler panels, grilles, wheel covers and exterior body parts. In such automotive environments, there is a need for developing polyphenylene ether resins that demonstrate various properties including high impact strength, and resistance to solvents and thermal exposure.

A number of investigations have been conducted with respect to incorporating rubbery polymers into polyphenylene ether resins to improve their impact strengths. By way of illustration, these include Cizek, U.S. Pat. No. 3,383,435, who used styrene resins combined with blended or grafted diene rubbers; Katchman and Lee, U.S. Pat. No. 4,128,602, who used styrene grafted diene rubbers; Cooper et al., U.S. Pat. No. 4,152,316, who used styrene grafted ethylene propylene diene (EPDM) terpolymer rubbers, and the like. Solvent resistance and thermal aging resistance are not optimum for special uses, although impact strengths are excellent.

Sulfonated EPDM has also been blended with polyphenylene ether resins free of styrene resins, e.g., European Patent Application No. 168,652, published Jan. 22, 1986, and, including styrene resin, e.g., PCT Invention Application 85/1056, published Mar. 14, 1985, the impact strength is improved, but again, solvent resistance is less than optimum.

In Haaf, U.S. Pat. No. 4,322,507, styrene-ethylenebutylene block copolymers are disclosed as impact modifiers in polystyrene-free blends of polyphenylene ether to improve thermal resistance, solvent resistance, and enhance resistance to delamination. Impact strength, while high, could be improved; and resistance to delamination, while good, could also be improved.

It has now been discovered that by functionalizing the polyphenylene ether and the rubber and melt reacting such functional groups, better compositions in terms of impact strength, resistance to delamination and surprisingly improved solvent resistance can be obtained.

Galluci et al., U.S. patent application Ser. No. 901,434, filed Aug. 28, 1986, disclose polyphenylene ether resins functionalized by using a modifier comprising at least one alpha, beta-unsaturated carboxylic acid, or derivative, or a malimide, to improve processability and resistance to oxidative degradation.

It has also been proposed to graft fumaric acid onto polyphenylene ether resin in an extrusion process before blending with poly(1,4-butylene terephthalate) and PPO to obtain improved impact strength and solvent resistance. Neither technique uses functionalized rubber however.

In the prior disclosures of Olivier, U.S. patent application, Ser. No. 690,613, filed Jan. 11, 1985, now abandoned, Pratt et al., U.S. patent application Ser. No. 004,089, filed Jan. 16, 1987, now abandoned, and McHale et al., U.S. patent application Ser. No. 027,707, filed Mar. 19, 1987, glycidyl methacrylate (GMA) grafted EPDM rubbers are described as impact modifiers for polyester resins. There is no hint or suggestion, however, in such prior disclosures that such functionalized rubbery impact modifiers could be used with functionalized polyphenylene ether resins to produce interpolymers, e.g., grafted copolymers having improved physical properties.

It has now been unexpectedly discovered that glycidyl methacrylate grafted natural and synthetic rubbers, e.g., EPDM (EPDM-g-GMA) impact modifiers can be incorporated into functionalized polyphenylene ether resins, e.g., fumaric acid functionalized poly(2,6-dimethyl-1,4-phenylene ether resins), to provide compositions of high impact strength, improved solvent resistance and overall better physical properties. Delamination is unexpectedly low while solvent resistance is surprisingly high.

SUMMARY OF THE INVENTION

In accordance with the present invention are provided compositions comprising the interpolymerization product of:

(a) a polyphenylene ether resin functionalized with a reactive compound selected from a dicarboxylic acid or the corresponding anhydride or a mixture thereof; and (b) an effective amount of an impact improving rubbery polymer grafted with glycidyl methacrylate, glycidyl acrylate or a mixture thereof, alone, or grafted in further combination with a $C_1$-$C_{18}$ alkyl methacrylate or acrylate or a mixture thereof.

Preferred features of the invention are compositions as defined above wherein the dicarboxylic acid or anhydride is selected from fumaric acid, maleic acid, maleic anhydride, itaconic acid, itaconic anhydride, citraconic acid, citraconic anhydride, trimellitic acid, trimellitic anhydride, trimellitic anhydride acid chloride or mixtures of any of the foregoing.

Also preferred herein are compositions as defined above wherein the rubbery polymer is selected from natural rubber, synthetic rubber or mixtures of natural and synthetic rubbers.

Further provided as preferred features are compositions above-defined wherein said rubbery polymer is a synthetic rubber selected from a diene homopolymer or copolymer having rubbery diene segments, a terpolymer comprising units of ethylene, propylene and a diene, or mixtures of any of the foregoing.

Preferred features of the invention are compositions as defined above wherein the reactive compound comprises fumaric acid in an amount of from about 0.1 to about 2.5 percent by weight based on the weight of the polyphenylene ether resin (a).

Also provided in accordance with this invention are methods for providing a composition adapted to produce a thermoshaped article having improved impact strength, thermal aging resistance and solvent resistance, said method comprising interpolymerizing (a) a polyphenylene ether resin functionalized with a reactive compound selected from a dicarboxylic acid or the corresponding anhydride or a mixture thereof; and (b) an effective amount of an impact improving rubbery polymer grafted with glycidyl methacrylate, glycidyl acrylate or a mixture thereof, alone, or grafted in further combination with a $C_1$-$C_{18}$ alkyl methacrylate or acrylate or a mixture thereof.

DETAILED DESCRIPTION OF THE INVENTION

The polyphenylene ethers (also known as polyphenylene oxides) used as component (a) in the present invention are a well known class of polymers which have become very useful commercially as a result of the discovery by Hay of an efficient and economical method of production (see, for example, U.S. Pats. Nos. 3,306,874 and 3,306,875). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

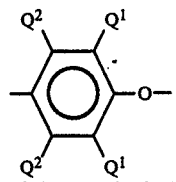
(I)

in which in each of these units independently each $Q^1$ is hydrogen, halogen, primary or secondary lower alkyl (i.e., alkyl containing up to 7 carbon atoms), phenyl, aminoalkyl or haloalkyl wherein at least two carbon atoms separate the halogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature, including various Hay patents.

The polyphenylene ether generally has a molecular weight (number average, as determined by gel permeation chromatography, whenever used herein) within the range of about 5,000 to 40,000. The intrinsic viscosity of the polymer is usually in the range of about 0.4 to 0.6 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pats. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, alpha-hydroxyoximes (both monomeric and polymeric), o-hydroxyaryl oximes, and alpha-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^3$ is independently hydrogen or alkyl, providing that the total number of carbon atoms in both $R^3$ radicals is 6 or less, and each $R^4$ is independently hydrogen or a $C_{1-6}$ primary alkyl radical. Preferably, each $R^3$ is hydrogen and each $R^4$ is alkyl, especially methyl or n-butyl.

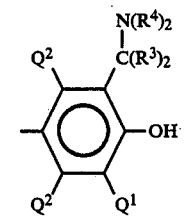
(II)

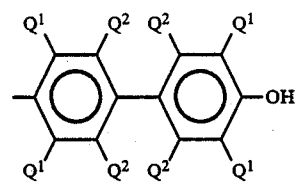
(III)

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the alpha-hydrogen atoms on one or more $Q^1$ radicals adjacent to the hydroxy group on the terminal unit of the polymer chain. During further processing and/or blending, the aminoalkyl-substituted end groups may undergo various reactions, possibly involving in quinone methide-type intermediate of formula IV, below ($R^3$ is defined as above), with beneficial effects often including an increase in impact strength and compatibilization with other blend components.

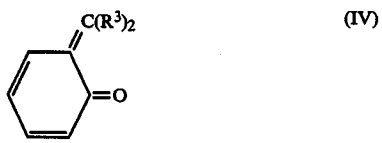

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pats. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

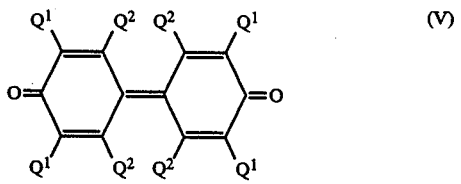

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The functionalizing compounds used in the present invention are typically PPO-reactive acids and anhydrides, such as aliphatic, cycloaliphatic and aromatic acids of from about 4 to about 30 carbon atoms. By "PPO-reactive" is meant capable of functionalizing polyphenylene ether molecules, generally by interacting with functional groups along or at the end of the chain. Typically, the functional group will be a terminal phenolic hydroxyl. Illustratively, the acids will comprise one or more of fumaric acid, maleic acid, succinic acid, itaconic acid, citraconic acid, trimellitic acid, or a reactive derivative of any of the foregoing, e.g., trimellitic anhydride acid chloride, also known as TAAC. Suitable acid anhydrides include trimellitic acid anhydride, maleic anhydride and the like, di- and polyfuntional carboxylic acids are preferred. For some reasons, unclear at this time, mono-carboxylic aliphatic unsaturated acids, such as acrylic acid are not suitable to functionalize PPO.

The preferred functionalizing promoting compounds of the present invention are fumaric acid, maleic acid, maleic anhydride, itaconic acid, itaconic anhydride, citraconic acid, citraconic anhydride, trimellitic acid, trimellitic acid anhydride, trimellitic anhydride acid chloride or a mixture of any of the foregoing. Especially preferred herein is fumaric acid.

The functionalizing compounds employed in the present invention are added to polyphenylene ethers in amounts which can vary broadly. Preferably, however, the amount will be of from 0.1 to 2.5% by weight, and especially preferably 0.5 to 1.25% percent by weight based on the weight of the polyphenylene ether resin (a).

The term "rubber" as used herein includes a polymeric materials, natural and synthetic, which are elastomers at room temperatures, e.g., 20° to 25° C. The term "rubber" includes, therefore, natural or synthetic rubbers of the type generally used in preparing impact polymers. Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are neutral crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxyterminated polybutadienes; poly-chlorobutadienes, e.g., neoprenes; polyisobutylene, and copolymers of isobutylene with butadiene or isoprene; polyisoprene; copolymers of ethylene and propylene and interpolymers thereof with butadiene and/or other dienes, e.g., norbornadiene; thiokol rubbers; polysulfide rubbers; acrylic rubbers; polyurethane rubbers; copolymers of dienes, e.g., butadiene and isoprene, with various comonomers, such as alkyl unsaturated esters, e.g., methyl methacrylate; unsaturated ketones, e.g., methylisopropenyl ketone; vinyl heterocyclics, e.g., vinyl pyridine; polyether rubbers; epichlorohydrin rubbers and the like. The preferred rubbers comprise ethylene-propylene nonconjugated diene rubbery terpolymer (EPDM).

The glycidyl ester grafted rubbery additives used as component (b) in this invention may be prepared from any of the natural or synthetic rubber.

To modify the foregoing polyphenylene ethers, they are preferably provided with terminal groups selected from the reaction products thereof with an organic di-acid, an organic di-acid halide, an organic di-acid anhydride, an organic di-acid anhydride acid halide or a mixture of any of the foregoing.

Many ways are known to those skilled in this are for forming such modified polyphenylene ethers. For example, Holoch and van Sorge, U.S. Pat. No. 3,637,578, describes heat treatment of the polymer to generate incipient, reactive hydroxyl groups on the polymer chain followed by reaction of generated hydroxyl groups with a material capable of reacting therewith to form the inert substituents. According to that patent, the polyphenylene ethers can be modified using either a one-step or a two-step functionalizing procedure. In the one step process, a solution is prepared by dissolving both the polymer and a functionalizing agent in a mutual solvent such as toluene, benzene, or any other liquid nonreactive with the polymer and functionalizing agent. The solution is heated to an elevated temperature, preferably to temperatures in excess of 250° F. and most preferably, to temperatures varying between 400° and 650° F. Heating may be performed in an autoclave using pressures exceeding atmospheric. The temperature is held for a period of time sufficient to allow any incipient hydroxyl groups to be generated. This is, of course, dependent upon the temperature used and the reactivity of the materials. In general times varying between 30 seconds and 2 hours have been found suitable. Hydroxyl groups are generated at the elevated temperature and simultaneously react with functionalizing agent to form substituents substantially inert to free radicals. Upon completion of the functionalizing reaction, the solution is cooled and the polymer recovered by precipitation with a polymer non-solvent such as methanol.

Alternatively, the one-step functionalizing reaction can be carried out dry by blending polymer in powder form with a functionalizing agent and extruding the blend at the elevated temperatures.

The two-step functionalizing procedure is similar to the one-step process and involves a first step of preheating the polymer, either in powder or solution form to generate hydroxyl groups in accordance with the procedure outlined above. The polymer may then be cooled and reacted with the functionalizing agent, at ambient or elevated temperatures to stabilize the polymer. At lower temperatures, it is desirable to use a catalyst such as boron trifluoride etherate, sodium acetate or a tertiary amine.

The specific functionalizing agents used are not critical providing they are reactive with hydroxyl groups to form a substituent inert to free radicals. Typical examples of functionalizing agents include acid halides, anhydrides, etc. Typical examples of acid halides include, but are not limited to, cinnamoyl chloride and trimellitic anhydride acid chloride. Typical examples of anhydrides, include for example, maleic anhydride, phthalic anhydride, etc.

Special mention is made of an especially preferred family of funcionalizing agents. These are of the formula:

(I)—Z—(II), wherein I and II are as defined above.

Illustratively, the group (I) portion of the functionalizing agent has been generalized as an acyl-functional group depicted by the following formula:

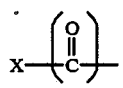

where X is F, Cl, Br, I, OH, OR or

etc. and where R is H or an aliphatic or aromatic radical having up to about 10 carbon atoms. Group (I) is covalently bonded to a Group II, e.g., an anhydride group.

Examples of suitable materials of general formula (I)—Z—(II) include but are not limited to the following:

Chloroethanoylsuccinic anhydride

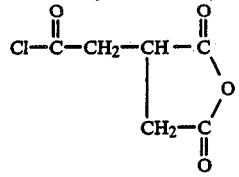

trimellitic anhydride acid chloride (TAAC)

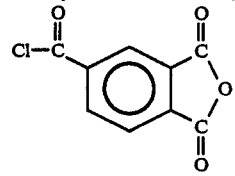

chloroformylsuccinic anhydride

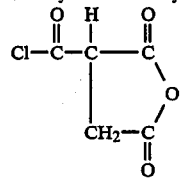

1-acetoxyacetyl-3,4-dibenzoic acid anhydride

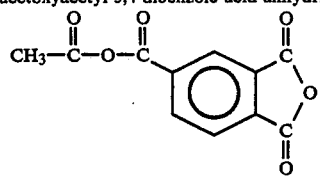

Special mention is made of the most preferred such compound, trimellitic anhydride acid chloride. Its use as a functionalizing agent and the use of the polyphenylene ethers reacted therewith in the compositions of this invention are exemplified hereinafter.

Backbone rubbers of the natural and synthetic type useful herein are commercially available and can be made by techniques well known to those skilled in this art.

EPDM terpolymers useful for preparing the grafted materials used in the invention are commercially available, e.g., Copolymer Corp. (Epsen ®55), or may be prepared using a Ziegler-type catalyst. The preparation of typical EPDM terpolymers is described, for example, in Gresham et al., U.S. Pat. No. 2,933,480; Tarney, U.S. Pat. No. 3,000,866; Guglielmino et al., U.S. Pat. No. 3,407,158; Gladding, U.S. Pat. No. 3,093,621 and U.S. Pat. No. 3,379,701. These terpolymers are characterized by the absence of chain or backbone unsaturation and the presence of sites of unsaturation in groups which are pendant to or are in cyclic structures outside of the main polymer chain.

Useful EPDM terpolymers for the production of the glycidyl ether grafted terpolymers used in this invention comprise ethylene, a $C_3$ to $C_{16}$ straight or branched chain alpha-olefin, preferably propylene, and a nonconjugated diolefin. Satisfactory nonconjugated dienes that may be used as the third monomer in the terpolymer include straight chain dienes such as 1,4-hexandiene, cyclic dienes such as cyclooctadiene and bridged cyclic dienes such as ethylidene norbornene.

Preferred EPDM terpolymers are comprised of about 10-95, preferably 45-70 mole percent, by weight ethylene, about 5 to 90, preferably 30-55 mole percent polypropylene and a minor amount of diene monomer, most preferably a polyunsaturated bridged ring hydrocarbon or halogenated derivative thereof, most preferably 5-ethylidene-2-norbornene. These EPDM terpolymers have a melt index of approximately 79 g/10 min., a Mooney viscosity of approximately 78 and a gram molecular weight of about 21,600.

Any one of the backbone rubbers or blends of such rubbers can be subsequently graft modified with a graft monomer of epoxy functional acrylate or methacrylate. Although grafting may occur by various reaction mechanisms as practically any point on the backbone rubber, generally, the grafting takes place at an unreacted point of unsaturation on the polyene. For this reason, it is desirable to make use of an ethylene, mono-olefin, polyene back bone rubber having at least two unsaturated carbon-to-carbon linkages per 100 carbon atoms and little additional benefit is derived from the use of unsaturated backbone rubber having more than 20 carbon-to-carbon double bonds per 100 carbon atoms. In the preferred practice of this invention, use is made of an unsaturated rubber having from 4-10 carbon-tocarbon double bonds per 1000 carbon atoms.

The point of ethylenic unsaturation on the epoxy functional graft monomer must be sufficiently reactive to react directly with the unsaturation of the polyene; or to react with a graft chain originating at, or for combination with, the polyene unsaturation. Such levels of reactivity require the alpha-beta situation of the ethylenic unsaturation as found in, for example, an epoxy functional esters of acrylic acid or alkyl acrylic acid. A free radical initiator, such as a dialkyl peroxide may be used to promote the graft reaction. Such initiator is generally used in an amount within the range of 1-5 parts per 100 parts by weight of the unsaturated rubber, and preferably in an amount within the range of 1-2 percent by weight.

Preferred as the graft monomer herein is glycidyl methacrylate (GMA).

The graft chain formed by the grafting process on the backbone rubber need not be a homopolymer or even be of entirely epoxy functional graft monomers. For example, combinations of the two above-mentioned epoxy functional graft monomers may be used as well as combinations of either or both with other C1-C18 alkyl acrylates or methacrylates, wherein $C_1$-$C_{18}$ may be straight chain or branched, e.g., methyl, ethyl, isopropyl, 2-ethyl-hexyl, decyl, n-octodecyl, and the like. Particularly useful such comonomer grafts are grafts of glycidyl acrylate and/or glycidyl methacrylate and methyl methacrylate.

It is preferred in the present invention that the gel content of the elastomeric material be controlled either during polymerization or in subsequent processing to achieve a value of greater than about 10% by weight and less than 80%, preferably 15% to 55%. With a gel content too low impact strength is high, but knit line strength is low. With a gel content too high, both impact strength and knit line strength not as high as desirable.

Gel content in an especially convenient analysis, according to ASTM D-3616, is measured by the weight percent of remaining elastomeric material after extraction in hexane or toluene. Gel content is an indication of the degree of cross-linking in the elastomeric material. Of course, persons skilled in the art are familiar with a variety of ways to control the degree of cross-linking and thus the gel content can be determined by numerous other methods. The crosslink reaction may be a direct rubber backbone to rubber backbone joining, an epoxy functionality to epoxy functionality or rubber backbone joining, or a graft chain free radical addition to a second graft chain or to a rubber backbone. Further, cross-linking may be achieved by the addition of a cross-linking agent to effectively achieve any of the above reactions. Thus, any of several steps to control gel content may be taken. Thermal aging will increase gel content. Increasing the amount of epoxy functional graft monomer will increase gel content. Increasing the amount of polyene monoene monomer in the rubber backbone will increase gel content. The addition of a cross-linking agent will increase gel content. The use of graft monomers with greater tendency to cross-link will increase gel content, for example, a homopolymer graft of glycidyl acrylate will cross-link more readily than a homopolymer graft of glycidyl methacrylate or a copolymer graft of glycidyl acrylate and methyl methacrylate.

As stated above, gel content of the elastomeric material used in this invention should range up to no higher than about 80%. Although cross-linking can be carried on well past this level, as has been mentioned, high levels of cross-linking diminish the dispersibility of the elastomeric material and lead to non-uniform mixing. Also, such high levels of localized cross-linking will create brittle areas within the elastomeric material which will decrease rubbery character. It is apparent that cross-linking should be uniformly dispersed throughout the elastomeric material.

It is preferred in the present invention that the elastomeric material have an epoxy functionality of at least 2.5 epoxy functionalities per 1000 carbon atoms, and preferably between about 5.0 and 13 epoxy functionalities per 1000 carbon atoms. Epoxy functionality means those epoxy sites which remain in the impact modifier resin after the loss of such functionalities as may react in the cross-linking reaction. In the instance of the use of GMA or GA as the epoxy functional graft monomer, a graft level of above about 1.0, preferably above about 1.5, and, most preferably, above about 2% by weight is necessary to provide the minimum level of epoxy as shown above. The maximum is not particularly critical, e.g., up to 10-15% by weight can be used, although no substantial benefit is obtained above about 10%.

The grafting reaction may be carried out in solvent solution with the unsaturated rubber backbone present in a concentration which may range from 10-30 percent by weight, with constant stirring, at an elevated temperature within the range of 125°-200° C. for a time ranging from ½ to 2 hours. The reaction condition can be varied depending somewhat upon the type and amount of catalyst and temperature conditions, as is well known to those skilled in the art. Where high amounts of graft monomer are to be attached to the backbone rubber, it has been found to be advantageous to carry out the graft reaction in the melt state of the backbone rubber, i.e., extruder grafting. This process is simply performed by feeding the backbone rubber, an excess of graft monomer, and an appropriate catalyst to a melt extruder and mixing and reacting the feed components at an elevated temperature.

In general, the amount of acid-functionalized polyphenylene ether resin can vary widely, e.g., up to 95% of the total composition. It has been found, however, that good balance between the mechanical properties and physical properties is attained with a blend comprising 10% EPDM-g-GMA and 90% polyphenylene ether resin. Higher quantities of the impact modifier may be employed but such may affect the physical appearance of the material, e.g., delamination.

The acid functionalized polyphenylene ether resin (PPO-g-FA) is formed in a separate extrusion step before blending with the functionalized rubber, e.g., EPDM-g-GMA. The amount of acid necessary to functionalize polyphenylene ether resin can vary within a limited range, e.g., from about 0.1 to 2.5, preferably 0.5 to 1.25 percent by weight, based on the weight of the polyphenylene ether resin. Amounts of acid in excess of 1.5 weight percent may diminish both the mechanical properties and the surface appearance of the blends.

The above described elastomeric material is physically dispersed in an acid functionalized polyphenylene ether resin melt to form discrete particles of rubbery polymer in a continuous phase of a thermoplastic matrix resin or blend. At least an impact strength improving amount of elastomeric material is dispersed in the matrix resin. Generally, this requires, as stated above, that the elastomeric material constitute at least 1.5 percent by weight, preferably 5 to 20 percent, most preferably 7.5 to 15 percent, by weight based on total thermoplastic content, including elastomeric material, of the molding composition. It will be apparent that, while the indicated composition range is optimum for making toughened rigid plastic articles, acceptable molding materials can still be made from mixtures with rubber contents much higher than this range. Compounding of the rubber and the acid-functionalized PPO is carried out by standard techniques, for example, by simple melt blending or dry mixing and melt extruding at an appropriate elevated temperature for any given thermoplastic matrix. The resultant admixture is then molded into a thermoplastic piece of specific dimensions or further extruded into a film or sheet product.

It is important to the final properties of molded parts containing elastomeric material that there is sufficient mixing in the extrusion of the resin melt. Herein, several reactions have been taught or suggested to take place in the extruder and such are, of course, effected by mixing as well as residence time in the extruder. Thus, thorough mixing of the polymer melt is suggested and, depending upon the equipment employed, two successive extrusions of the melt may be required.

Compounding can be carried out in conventional equipment. For example, after pre-drying the thermoplastic polyphenylene ether resin and acid, e.g., at 125° C. for 4 hours, a single screw extruder is fed with a dry blend of the acid-functionalized polyphenylene ether resin, and the additive ingredients, e.g., antioxidant and/or stabilizer, the screw employed having a long transition and metering section to insure melting. On the other hand, a twin screw extrusion machine, e.g., a 28 mm or 30 mm or even 90 mm Werner Pfleiderer machine can be fed with resin and additives at the feed port. In either case, a generally suitable machine temperature will be about 500° F. to 572° F.

The compounded composition can be extruded and cut up into molding components such as conventional granules, pellets, etc., by standard techniques.

The compositions of this invention can be molded in any equipment conventionally used for thermoplastic compositions. For example, with polyphenylene ether resin good results will be obtained in an injection molding machine, e.g., of the Newbury type or a Cincinnati 75 ton type with conventional cylinder temperature, e.g., 580° F. and conventional mold temperatures, e.g., 230° F.

It is to be understood that the foregoing compositions may contain other additives known in the art, including, but without limitation, mold release agents, flow promoters, antioxidants, coloring agents, coupling agents, and stabilizers. The elastomeric containing molding compositions of this invention may be used as molding pellets and may contain pigments, dyes, stabilizers, plasticizers, and the like. One may readily determine which are necessary and suitable for a particular application.

DESCRIPTION OF THE PREFERRED EMBODIMENTS

The following examples illustrate the preferred invention. The claims are not to be construed to be limited by them in any manner whatsoever.

PROCEDURE A

Polyphenylene ether resin powder, i.v. 0.46 dl./g., in chloroform at 30° C., and 0.7 wt % of fumaric acid were mixed and extruded in a vacuum-vented Werner Pfleiderer extruder at 572° F. to produce pellets of fumaric acid functionalized poly(2,6-dimethyl-1,4-phenylene)ether.

PROCEDURE B 100 parts by weight of backbone rubber, Epsyn ®55 resin, Copolymer Chemical and Rubber Company; 0.1 parts by weight of antioxidant; 7.4 parts by weight of glycidyl methacrylate; and 0.74 parts by weight initiator, are passed through a WP30 twin screw extruder. Zone temperatures are 200° C., the die temperature is 200° C., and screw speed is 160rpm. The water cooled strands of elastomeric material are chopped into pellets. Analysis of the pellets indicates 5.4 weight percent glycidyl methacrylate and 29 by weight gel content.

EXAMPLES 1-2

Using the fumaric acid functionalized polyphenylene ether resin produced in Procedure A and the EPDM-g-GMA impact modifier described in Procedure B, compositions in accordance with this invention were form-blended and extruded on a Werner Pfleiderer machine at 300° C., and subsequently molded on a Cincinnati Machine into workpieces for testing. For comparison purposes, a formulation of polyphenylene oxide (PPO) and styrene-ethylene-butylene block copolymer available under the tradename Kraton-G, Shell Chemical, was also tested. The compositions and test results are set forth in Table 1.

TABLE 1

Thermoplastic Compositions PPO—g-FA/EPDM—g-GMA

| | Example | | | | | | |
|---|---|---|---|---|---|---|---|
| | 1A* | 1B* | 1C* | 1D* | 1E* | 1 | 2 |
| Composition (parts by weight) | | | | | | | |
| PPO (I.V. = 0.46) | 100 | — | — | 90 | 90 | — | — |
| PPO (I.V. = 0.40) | — | 100 | 90 | — | — | — | — |
| PPO—g-FA | — | — | — | — | — | 90 | 80 |
| EPDM | — | — | 10 | — | — | — | — |
| Styrene-ethylene butylene block copolymer | — | — | — | 10 | — | — | — |
| EPDM—g-GMA | — | — | — | — | 10 | 10 | 20 |
| Results | | | | | | | |
| Notched Izod, ft.lb./in. | 1.0 | 1.0 | 5.5 | 7.0 | 4.5 | 7.5 | 8.8 |
| Unnotched Izod, Double Gate, ft.lb./in. | 5.0 | 5.5 | 1.1 | 6.9 | 2.5 | 2.6 | 3.0 |
| Delamination | — | — | evident pearlesent | some | some | none | slight |

*Comparative Example

The results above indicate that compositions of high impact strength and knit-line characteristics with little or no delamination can be prepared in accordance with this invention.

EXAMPLE 3

Acid functionalized polyphenylene ether resin which was impact modified with EPDM-g-GMA was tested for solvent resistance using four chemicals commonly found in an automotive environment. The compositions employed and results obtained are set forth in Table 2:

TABLE 2

Thermoplastic Compositions: PPO—g-FA/EPDM—g-GMA

| | EXAMPLE | | | |
|---|---|---|---|---|
| | 3A | 3B | 3C | 3 |
| Composition (parts by weight) | | | | |
| PPO (iv = 0.46) | 100 | 90 | 90 | — |
| EPDM | — | 10 | — | — |
| Styrene-ethyelene-butylene-styrene block copolymer | — | — | 10 | — |
| PPO—g-FA | — | — | — | 90 |
| EPDM—g-GMA | — | — | — | 10 |
| Results | | | | |
| Solvent | | | | |
| Oil (%) strain at which cracks started | 0.5 | NC | 1.5 | NC |
| Gasoline (%) | 0.1 | Crazes | 1 | Crazes |
| Antifreeze | NC | NC | NC | NC |
| Windshield Washer Fluid | NC | NC | NC | NC |

NC = No Cracks

The results indicate that compositions with surprisingly excellent solvent resistance can be prepared according to this invention.

EXAMPLE 4

A composition was prepared by following the steps in Procedures A and B. The composition was comprised of 90% PPO-g-FA (0.7% fumaric acid) and 10% EPDM-g-GMA (GMA content 5.4%, gel content of 29%). The composition used and the test results are given in Table 3.

TABLE 3

| Thermoplastic Compositions/PPO—g-FA/EPDM—g-GMA | |
|---|---|
| Notched Izod ft.lb./in. | 7.5 |
| Unnotched Izod Double Gate ft.lb./in. | 2.5 |
| Gardner Impact ft.lb. | 18.4 |
| Tensile Modulus psi | 310,000 |
| Yield stress, psi | 8,900 |
| HDT @ 264 psi, °F. | 367 |

The data above indicate that polyphenylene ether resin compositions with excellent physical and thermal properties can be obtained according to this invention.

The above patents, applications and publications are incorporated herein by reference.

Many variations will suggest themselves to those skilled in the art, in light of the above, detailed description. For example, instead of using poly(2,6-dimethyl-1,4-phenylene ether) resin as component (a), other resins, such as poly(2,6-dimethyl-co-2,3,6-trimethyl-1,4-phenylene ether) or poly(2,6-diethyl-1,4-phenylene ether) can be used. Instead of fumaric acid, maleic acid, maleic anhydride, trimellitic anhydride acid chloride can be employed as functionalizing agents for the polyphenylene ether resin. Instead of glycidyl methacrylate, a mixture of glycidyl acrylate and methyl methacrylate or a mixture of glycidyl methacrylate and octadecyl methacrylate can be used. Instead of EPDM as the backbone rubber, polybutadiene rubber, styrene butadiene rubber, styrene ethylene butylene styrene block terpolymer rubber, and natural rubber can be used. Instead of injection molding, blow molding, including injection blow molding can be used. Furthermore, other additives known to those skilled in the art may be added in conventional amounts to the impact modified compositions herein including but without limitation, mole release agents, flow promoters, coloring agents, flame retardants, coupling agents and stabilizers.

All such obvious variations are within the full intended scope of the appended claims.

I claim:

1. A composition comprising the interpolymerization product of:
   (a) a polyphenylene ether resin functionalized with a reactive compound selected from the group consisting of a dicarboxylic acid, the corresponding anhydride, and a mixture thereof; and
   (b) an effective amount of an impact improving rubbery polymer grafted with (i) a compound selected from the group consisting of glycidyl methacrylate, glycidyl acrylate, and a mixture thereof, or (ii) a compound selected from the group consisting of glycidyl methacrylate, glycidyl acrylate, and a mixture thereof in further combination with a compound selected from the group consisting of a $C_1$-$C_{18}$ alkyl methacrylate, a $C_1$-$C_{18}$ alkyl acrylate and a mixture thereof said interpolymerization comprises melt blending the functionalized polyphenylene ether resin component (a) and the rubbery polymer (b) unitl the reaction is substantially complete.

2. A composition as defined in claim 1 wherein said dicarboxylic acid or anhydride is selected from the group consisting of fumaric acid, maleic acid, maleic anhydride, itaconic acid, itaconic anhydride, citraconic acid, citraconic anhydride, and a mixture of any of the foregoing.

3. A composition as defined in claim 1 wherein said rubbery polymer is selected from the group consisting of natural rubber, synthetic rubber and a mixture thereof.

4. A composition as defined in claim 3 wherein said rubbery polymer is a synthetic terpolymer comprising units of ethylene, propylene and a diene.

5. A composition as defined in claim 1, wherein the polyphenylene ether resin (a) is a homopolymer or copolymer containing structural units of the formula:

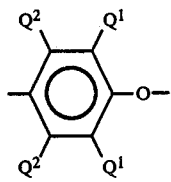

in which for each of these units independently each $Q^1$ is hydrogen, halogen, primary or secondary lower alkyl having up to seven carbon atoms, phenyl, aminoalkyl or haloalkyl wherein at least two carbon atoms separate the halogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

6. A composition as defined in claim 1, wherein the polyphenylene ether resin is poly(2,6-dimethyl-1,4-phenylene ether).

7. A composition as defined in claim 6, wherein the poly(2,6-dimethyl-1,4-phenylene ether) has an intrinsic viscosity of about 0.4 to 0.6 deciliters per gram in chloroform at 25° C.

8. A composition as defined in claim 1, wherein said dicarboxylic acid or anhydride comprises fumaric acid.

9. A composition as defined claim 4, wherein the grafted terpolymer is derived from approximately 45 to 70 mole percent ethylene, approximately 30-55 mole percent propylene and a minor amount of 5-ethylidene-2-norbornene.

10. A composition as defined in claim 1, wherein said acid, anhydride or mixture thereof comprises from about 0.1 to 2.5% by weight based on the weight of the polyphenylene ether resin (a).

11. A composition as defined in claim 10, wherein said acid, anhydride or mixture thereof comprises from about 0.5 to 1.25% by weight based on the weight of the polyphenylene ether resin (a).

12. A composition as defined in claim 1 wherein the glycidyl ester grafted rubbery polymer (b) comprises from about 5 to about 20 percent by weight based on the total of (a) and (b).

13. A composition as defined in claim 12 wherein the grafted rubbery polymer (b) comprises from about 7.5 to about 15.0 percent by weight based on the total of (a) and (b).

14. A method for providing a composition adapted to produce a thermoshaped article having high impact strength and improved solvent resistance comprising
(a) a polyphenylene ether resin functionalized with a reactive compound selected from a dicarboxylic acid or the corresponding anhydride or a mixture thereof, said method comprising adding
(b) an effective amount of an impact improving rubbery polymer grafted with (i) a compound selected from the group consisting of glycidyl methacrylate, glycidyl acrylate, and a mixture thereof, or
(ii) a compound selected from the group consisting of a glycidyl methacrylate, glycidyl acrylate, and a mixture thereof in further combination with a compound selected from the group consisting of a $C_1$-$C_{18}$ alkyl methacrylate, a $C_1$-$C_{18}$ alkyl acrylate and a mixture thereof said method comprises melt blending the functionalized polyphenylene ether resin component (a) and the rubbery polymer (b) until the reaction is substantially complete.

15. A composition as defined in claim 14 wherein said dicarboxylic acid or anhydride is selected from fumaric acid, maleic acid, maleic anhydride, itaconic acid, itaconic anhydride, citraconic acid, citraconic anhydride, trimellitic acid, trimellitic anhydride, trimellitic anhydride acid chloride, or a mixture of any of the foregoing.

16. A composition as defined in claim 14 wherein said rubbery polymer is selected from natural rubber, synthetic rubber or a mixture thereof.

17. A composition as defined in claim 16 wherein said rubbery polymer is a synthetic rubber terpolymer comprising units of ethylene, propylene and a diene.

18. A method as defined in claim 14, wherein the polyphenylene ether resin (a) is a homopolymer or copolymer containing structural units of the formula:

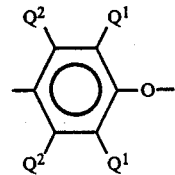

in which for each of these units independently each $Q^1$ is hydrogen, halogen, primary or secondary lower alkyl having up to seven carbon atoms, phenyl, aminoalkyl or haloalkyl wherein at least two carbon atoms separate the halogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

19. A method as defined in claim 14, wherein the polyphenylene ether resin is poly(2,6-dimethyl-1,4phenylene ether).

20. A method as defined in claim 19, wherein the poly(2,6-dimethyl-1,4-phenylene ether) has an intrinsic viscosity of about 0.4 to 0.6 deciliters per gram in chloroform at 25° C.

21. A method as defined in claim 14, wherein said dicarboxylic acid or anhydride comprises fumaric acid.

22. A method as defined claim 17 wherein the grafted terpolymer is derived from approximately 45 to 70 mole percent ethylene, approximately 30–55 mole percent propylene and a minor amount of 5-ethylidene-2-norbornene.

23. A method as defined in claim 14, wherein said acid, anhydride or mixture thereof comprises from about 0.1 to 2.5% by weight based on the weight of the polyphenylene ether resin (a).

24. A method as defined in claim 23, wherein said acid, anhydride or mixture thereof comprises from about 0.5 to 1.25% by weight based on the weight of the polyphenylene ether resin (a).

25. A method as defined in claim 14 wherein the glycidyl ester grafted rubbery polymer (b) comprises from about 5 to about 20 percent by weight based on the total of (a) and (b).

26. A method as defined in claim 25 wherein the grafted rubbery polymer (b) comprises from about 7.5 to about 15.0 percent by weight based on the total of (a) and (b).

27. An article thermoformed from the composition of claim 1.

28. A composition comprising the interpolymerization product of:
(a) a polyphenylene ether resin functionalized with a reactive compound selected from the group consisting of fumaric acid, maleic acid, maleic anhydride, itaconic acid, itaconic anhydride, citraconic acid, citraconic anhydride, and a mixture of any of the following; and
(b) an effective amount of an impact improving rubbery terpolymer having rubber diene segments grafted with (i) a compound selected from the group consisting of glycidyl methacrylate, glycidyl acrylate, and a mixture thereof, or
(ii) a compound selected from the group consisting of glycidyl methacrylate, glycidyl acrylate, and a mixture thereof, in further combination with compound selected from the group consisting of a $C_1$–$C_{18}$ alkyl methacrylate, a $C_1$–$C_{18}$ alkyl acrylate, and a mixture thereof.

29. A composition as defined in claim 28 wherein said rubbery terpolymer comprises units of ethylene, propylene and a diene.

30. A composition as defined in claim 29 wherein the polyphenylene ether resin is poly(2,6-dimethyl-1,4-phenylene ether).

31. A composition as defined in claim 30 wherein said reactive compound comprises fumaric acid.

* * * * *